United States Patent
Mitteer et al.

(10) Patent No.: US 10,578,005 B2
(45) Date of Patent: Mar. 3, 2020

(54) SMART TWO-PUMP APPARATUS, CONTROL AND METHOD

(71) Applicant: GHSP, INC., Grand Haven, MI (US)

(72) Inventors: David Michael Mitteer, Shelby, MI (US); Bradley John Vecellio, Spring Lake, MI (US)

(73) Assignee: GHSP, Inc., Grand Haven, MI (US)

( * ) Notice: Subject to any disclaimer, the term of this patent is extended or adjusted under 35 U.S.C. 154(b) by 263 days.

(21) Appl. No.: 15/418,939

(22) Filed: Jan. 30, 2017

(65) Prior Publication Data

US 2017/0218833 A1    Aug. 3, 2017

Related U.S. Application Data

(60) Provisional application No. 62/289,531, filed on Feb. 1, 2016.

(51) Int. Cl.

| | |
|---|---|
| *F01P 7/14* | (2006.01) |
| *B60K 1/00* | (2006.01) |
| *B60K 6/22* | (2007.10) |
| *B60K 11/02* | (2006.01) |
| *F01P 11/00* | (2006.01) |
| *F01P 7/16* | (2006.01) |
| *F01P 5/10* | (2006.01) |

(52) U.S. Cl.
CPC .................. *F01P 7/14* (2013.01); *B60K 1/00* (2013.01); *B60K 6/22* (2013.01); *B60K 11/02* (2013.01); *F01P 7/165* (2013.01); *F01P 11/00* (2013.01); *B60K 2001/003* (2013.01); *B60K 2001/005* (2013.01); *B60K 2001/006* (2013.01); *B60Y 2306/05* (2013.01); *F01P 2005/105* (2013.01); *F01P 2007/146* (2013.01); *F01P 2025/04* (2013.01); *F01P 2031/36* (2013.01)

(58) Field of Classification Search
CPC .................................................... F04D 15/0072
USPC ............... 417/62; 137/565.3, 565.32, 565.33
See application file for complete search history.

(56) References Cited

U.S. PATENT DOCUMENTS

| | | | | |
|---|---|---|---|---|
| 2,218,565 | A | * 10/1940 | Vickers | .................. F04B 49/007 417/253 |
| 2,541,291 | A | * 2/1951 | Robinson | ................. F16H 61/44 417/253 |

(Continued)

*Primary Examiner* — Peter J Bertheaud
*Assistant Examiner* — Geoffrey S Lee
(74) *Attorney, Agent, or Firm* — Price Heneveld LLP

(57) ABSTRACT

An apparatus includes two pumps and a circuit-changing valve connected to two cooling circuits, with the valve being controlled by a pressure differential created by the pumps. This simplifies controls, reduces components of the pumping system, and also provides a backup pump for each system. The valve's spool is controlled so that when the first pump is started before the second pump (or it generates a higher fluid pressure), the valve causes the two pumps to be connected in a serial arrangement with fluid being pumped through the first circuit and then through the second circuit. But when the second pump is started before the first pump, the valve causes the two pumps to be connected in a parallel arrangement so that the first pump moves fluid only through the first circuit, and the second pump moves fluid only through the second circuit. The valve includes an anti-dithering device.

10 Claims, 10 Drawing Sheets

(56) References Cited

U.S. PATENT DOCUMENTS

| | | | | |
|---|---|---|---|---|
| 3,791,780 A * | 2/1974 | Fritch | .................... | F04C 28/02 |
| | | | | 418/60 |
| 8,402,776 B2 * | 3/2013 | Johnston | ............... | B60L 3/0046 |
| | | | | 62/513 |
| 2015/0308435 A1 | 10/2015 | Rosinski et al. | | |
| 2016/0107508 A1 * | 4/2016 | Johnston | ............ | B60H 1/00278 |
| | | | | 165/202 |
| 2016/0318370 A1 * | 11/2016 | Rawlinson | ......... | B60H 1/00278 |
| 2016/0344074 A1 * | 11/2016 | Zhou | ................. | H01M 10/6569 |
| 2018/0178615 A1 * | 6/2018 | Xia | .................... | B60H 1/00271 |

\* cited by examiner

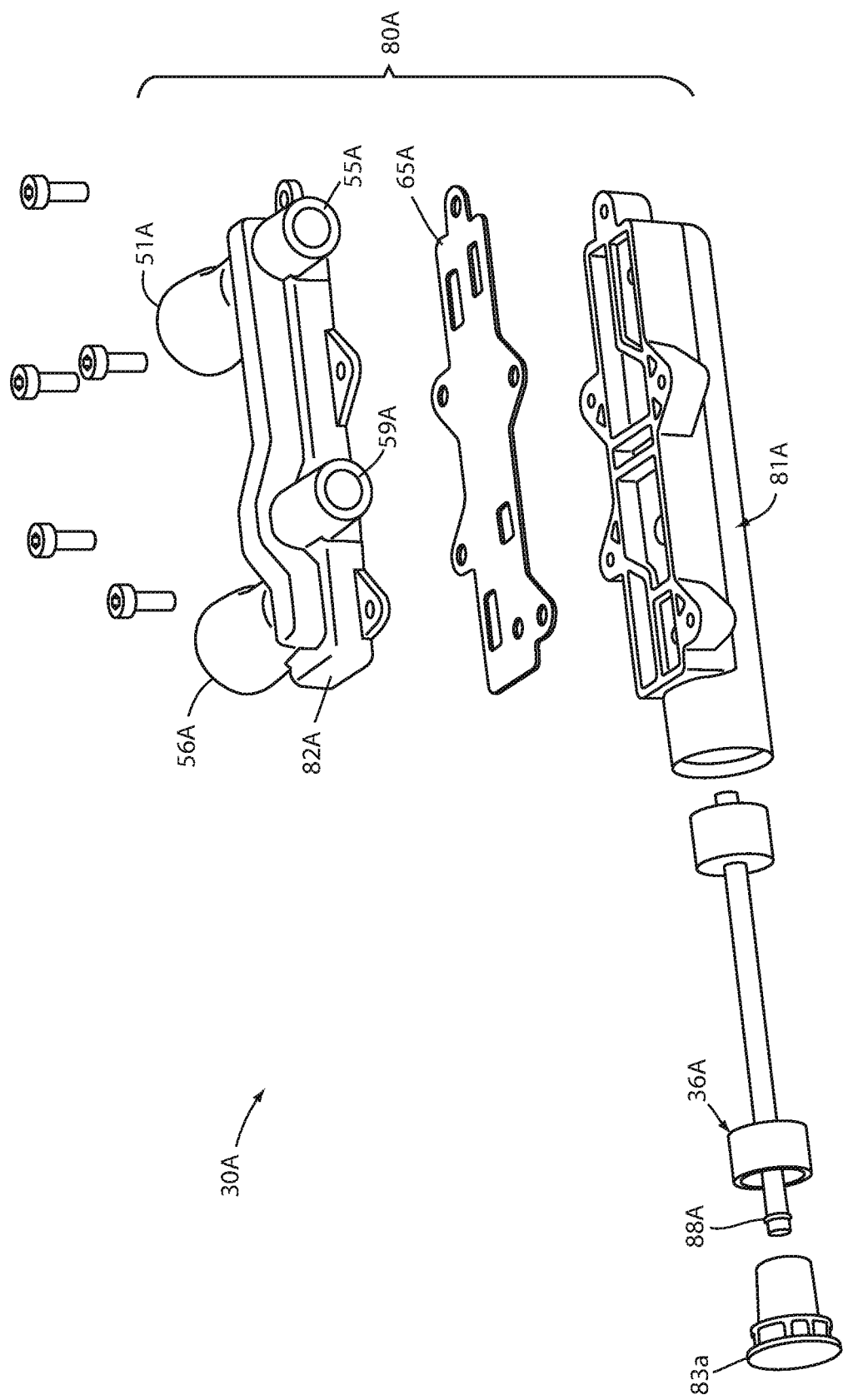

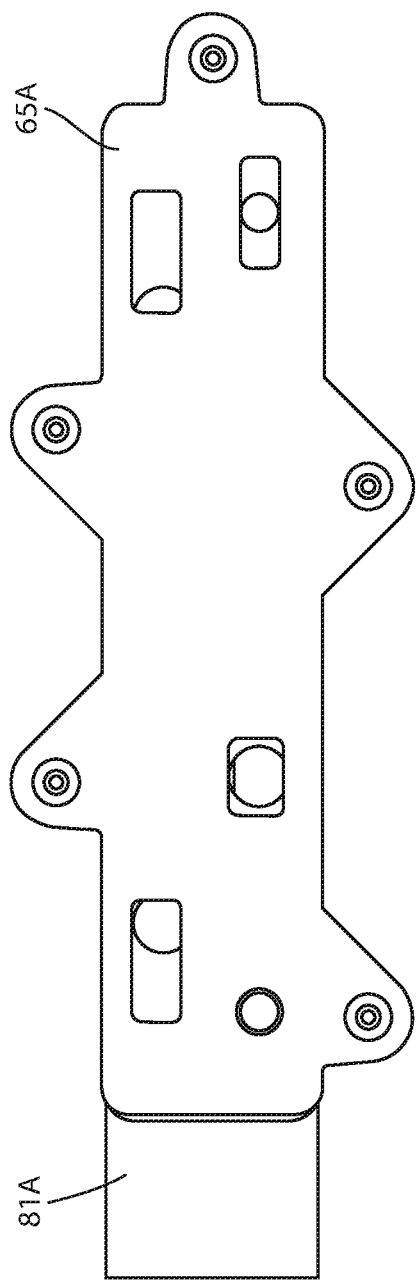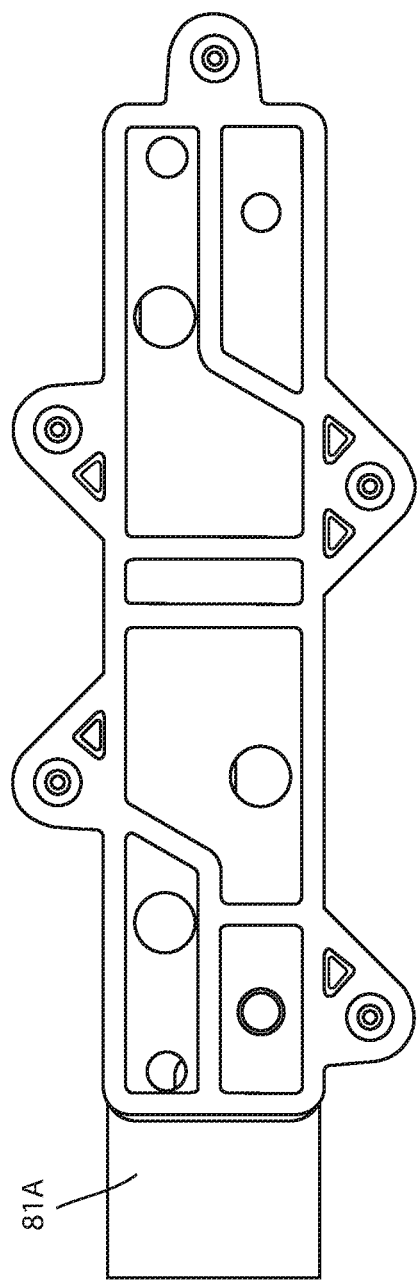

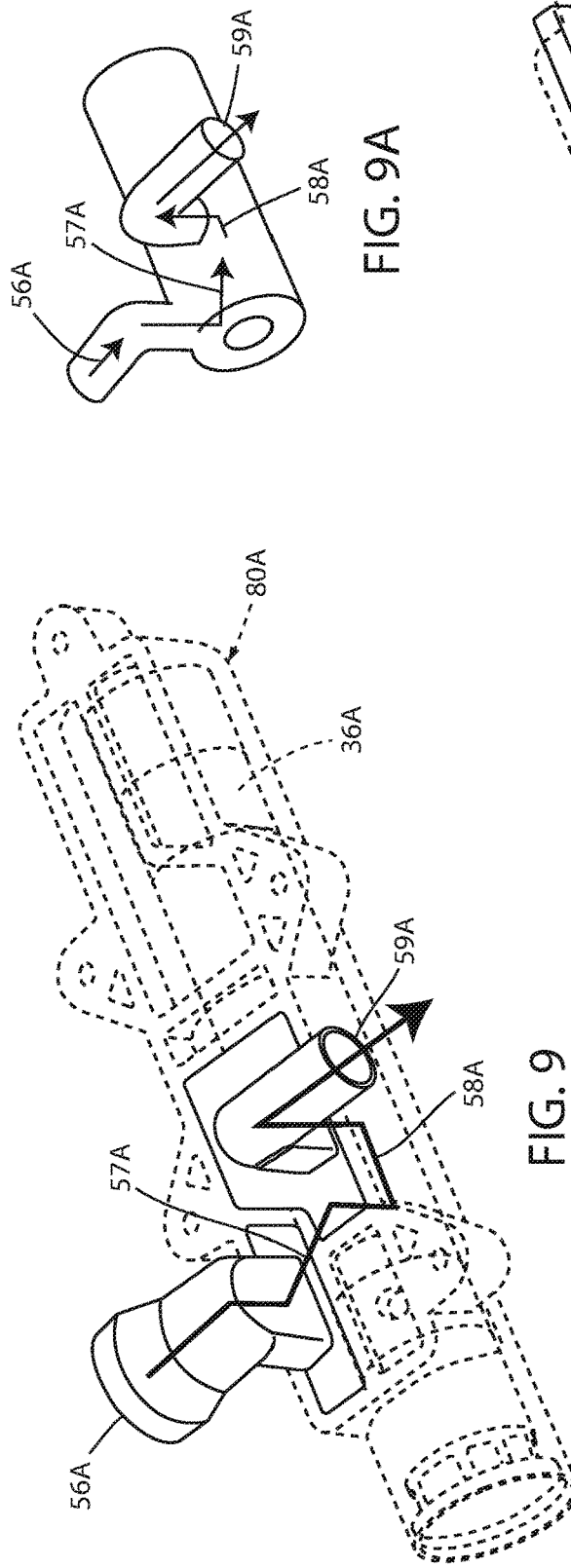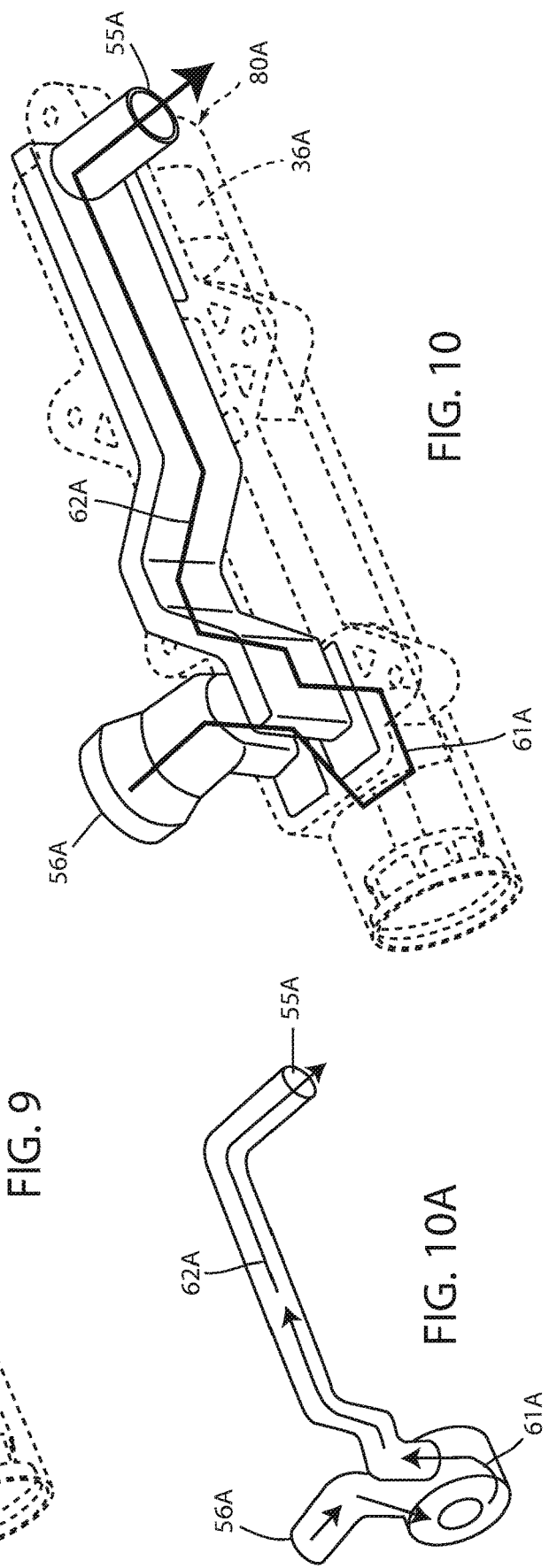

SMART TWO-PUMP APPARATUS, CONTROL AND METHOD

CROSS-REFERENCE TO RELATED APPLICATION

This application claims benefit under 35 USC section 119(e) of Provisional Application No. 62/289,531, filed Feb. 1, 2016, entitled SMART TWO-PUMP APPARATUS, CONTROL AND METHOD, the entire disclosure of which is incorporated herein by reference.

BACKGROUND

The present invention relates to pumping systems in vehicles, such as are used to pump coolant fluid to cool on-board heat-generating systems (e.g., a power source such as a battery bank and a powertrain such as engine and transmission or super-charger).

Vehicles include cooling circuits for cooling heat-generating components of a vehicle, such as a vehicle's battery bank (in electric and hybrid vehicles) and a vehicle's powertrain (e.g., antifreeze for combustion engine cooling and transmission fluid for transmissions). Traditionally, this has been done using separate pumps. However, if one of the pumps fails, the cooling circuit of that pump will be insufficient or fail, and the associated vehicle components will soon overheat.

Traditional valves could potentially be used to control flow from two pumps into one or more circuits. However, such systems require multiple valves and/or a complex valve, and also require control systems for selective actuation. A simplified system is desired that is flexible in design, effective in performance, robust and durable, yet utilizes a minimum of components and utilizes generally non-complex components.

SUMMARY OF THE PRESENT INVENTION

In one aspect of the present invention, a pump apparatus having separate first and second fluid cooling circuits comprises first and second pumps; and a circuit-changing valve with a valve housing defining first and second inlets connected to the first and second pumps, respectively, and having first and second outlets connected to the first and second cooling circuits, respectively. The valve has a spool shiftable relative to the first and second inlets and the first and second outlets. The valve and spool are configured so that when the first pump generates a pressure differential compared to the second pump, the spool shifts and causes the first and second pumps to be connected in a serial arrangement where the first inlet is connected to the second outlet and the second inlet is connected to the first outlet, thus causing fluid from the first and second pumps to flow in series through both the first circuit and the second circuit. The valve and spool are further configured so that when the second pump generates a pressure differential compared to the first pump, the spool shifts to a different position and causes the first and second pumps to be connected in a parallel arrangement where the first inlet is connected to the first outlet and the second inlet is connected to the second outlet, thus causing fluid from the first pump to flow only through the first circuit and fluid from the second pump to flow only through the second circuit.

In a narrower aspect of the present invention, a detent feature on the spool interfaces with a feature of the valve housing, a plug, or the like, to provide a mechanical resistance to movement of the spool until a predetermined force created by differential fluid pressure between a first valve inlet and a second valve inlet acting on the spool is reached. The predetermined force is tunable by design to the desired switching pressure differential to cause a change in position of the spool from a first position to a second position to select a desired fluid circuit configuration such as a parallel arrangement or a series arrangement.

In another narrower aspect, an anti-dithering device is associated with the valve to prevent unacceptable dithering and/or oscillation of the valve's spool.

A method of controlling first and second fluid cooling circuits comprises providing first and second pumps; and providing a circuit-changing valve with a valve housing defining first and second inlets connected to the first and second pumps, respectively, and having first and second outlets connected to the first and second cooling circuits, respectively; the valve having a spool shiftable relative to the first and second inlets and the first and second outlets. The method includes when the first pump is started before the second pump or causes sufficient difference in pressure in a first valve inlet compared to a second valve inlet, moving the spool to a first position to cause the first and second pumps to be connected in a serial arrangement where the first inlet is connected to the second outlet and the second inlet is connected to the first outlet, thus causing fluid from the first and second pumps to flow in series through both the first circuit and the second circuit. The method includes when the second pump is started before the first pump or causes sufficient difference in pressure in a second valve inlet compared to a first valve inlet, moving the spool to a second position to cause the first and second pumps to be connected in a parallel arrangement where the first inlet is connected to the first outlet and the second inlet is connected to the second outlet, thus causing fluid from the first pump to flow only through the first circuit and fluid from the second pump to flow only through the second circuit.

A method of controlling first and second fluid cooling circuits comprising providing first and second pumps with positive displacement, providing a circuit-changing valve defining first and second inlets connected to the first and second pumps, respectively, and having first and second outlets connected to the first and second cooling circuits, respectively; the valve having a spool shiftable relative to the first and second inlets and the first and second outlets when the first pump flow direction is reversed, generating a vacuum or negative pressure in the first inlet less than the pressure in the second inlet that shifts the spool to a first position, and when the second pump flow direction is reversed, generating a vacuum or negative pressure in the second inlet less than the pressure in the first inlet that shifts the spool to a second position. The valve is connected in a way so that the first and second positions of the spool advantageously affect the flow of coolant in the first and second cooling circuits, and advantageously affect pump operation.

An object of the present invention is to eliminate many of the controls and components for controlling operation of two pumps interconnected to and controlled by an electrohydraulic valve. The present improvement significantly reduces the need for several items such as electrical hardware, software, electromagnets and wiring harnesses otherwise needed to control pumps and cooling circuits to which the pumps are connected. It also allows selecting preferred fluid circuit configurations using the controllable outputs of the two pumps.

An object of the present invention is to provide a two-pump pumping system on a cooling system capable of providing continued cooling even when one of the two pumps fails.

These and other aspects, objects, and features of the present invention will be understood and appreciated by those skilled in the art upon studying the following specification, claims, and appended drawings.

BRIEF DESCRIPTION OF DRAWINGS

FIGS. 5-6 are perspective and exploded-perspective views of a prototype dual pump apparatus incorporating two pumps and a circuit-switching valve connected in an arrangement to result in a functional control similar to that shown in FIGS. 1-4.

FIG. 7 is a plan view of the valve in FIGS. 5-6, taken toward the gasket and valve.

FIG. 8 is a plan view like FIG. 7, but with the gasket removed to thus better show underlying ports.

FIG. 9 is a perspective view of the apparatus of FIG. 5 with the valve housing shown as transparent, the valve housing defining inputs 1 and 2, and outputs A and B, the valve spool being in a first position and showing a flow path (highlighted) from input 1 to output A; and FIG. 9A is a view of the fluid flow from the input 1 to output A with the structure eliminated to better show a path of fluid movement.

FIG. 10 is a perspective view of the apparatus like FIG. 9 with the valve housing shown as transparent, the valve spool being in a shifted second position and showing a flow path (highlighted) from input 1 to output B; and FIG. 10A is a view of the fluid flow from the input 1 to output B with the structure eliminated to better show a path of fluid movement.

DETAILED DESCRIPTION OF PREFERRED EMBODIMENTS

Figure 1:
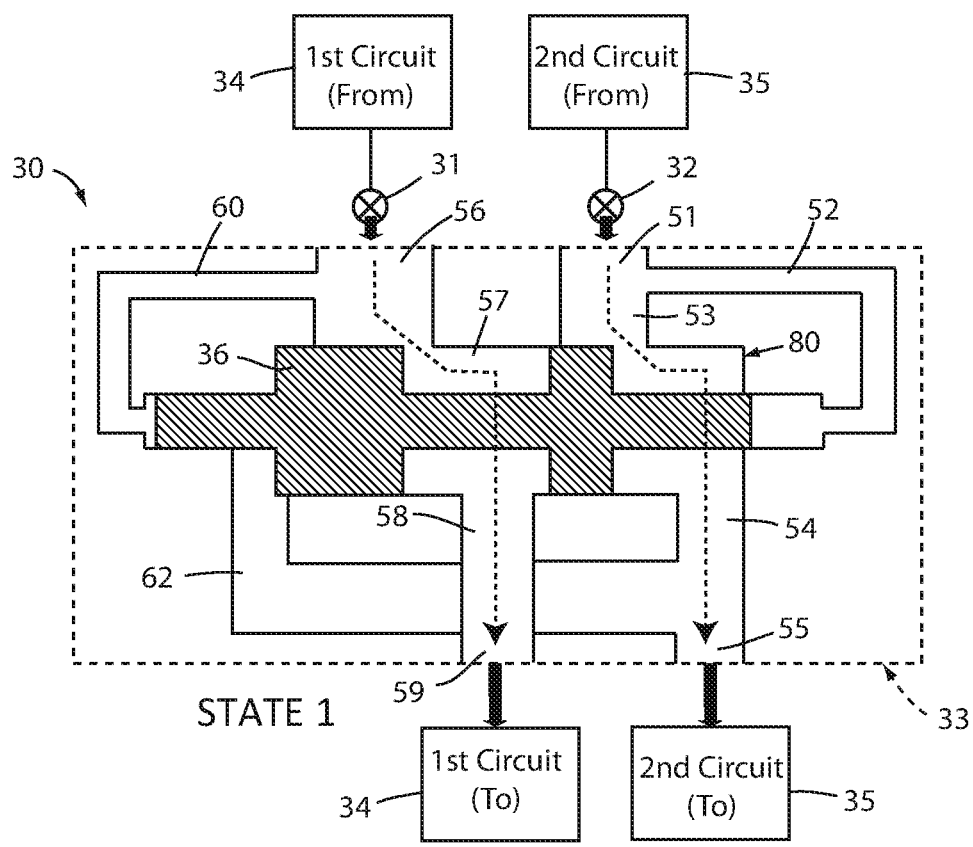
FIGS. 1-2 are schematic views of a pump apparatus including two pumps and a circuit-changing valve connected to a battery cooling circuit and a powertrain cooling circuit in a parallel arrangement (i.e. separated circuits), the valve being in a state where one pump moves fluid through the battery cooling circuit and the other pump moves fluid through the powertrain cooling circuit.

A pump apparatus 30 (FIG. 1) is provided for use on vehicles, such as passenger vehicles and other wheeled passenger-carrying and load-carrying vehicles, where the vehicles have multiple cooling circuits; such as a first cooling circuit for cooling at least one of a vehicle power train, an engine, a transmission, an associated auxiliary system, and any combination thereof and a second cooling circuit being for cooling at least one of a battery, an electrical power source, an inverter, a turbocharging heating system, a vehicle heating system; and any combination thereof. The present apparatus simplifies pump and cooling system controls, reduces and/or eliminates components (and thus reduces overall weight), provides an integrated backup for pump failure, and provides a compact integrated system.

Figure 2:
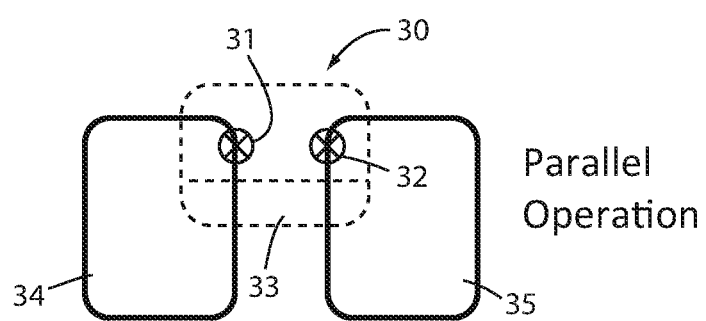
Figure 3:
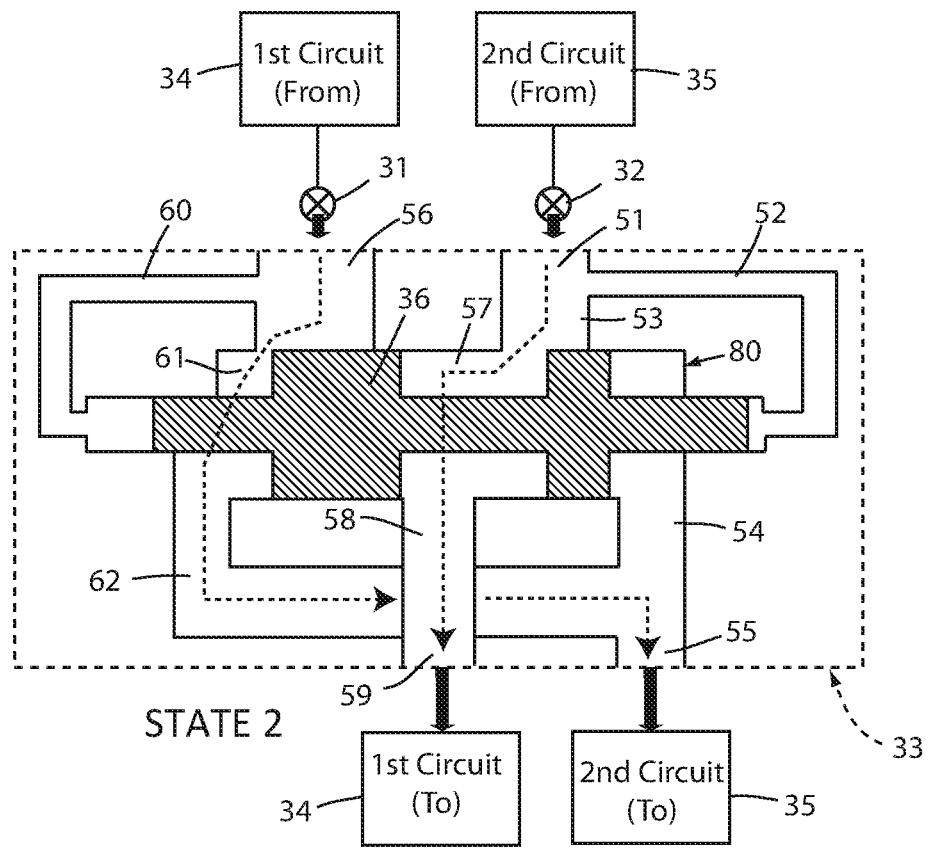
FIGS. 3-4 are schematic views of a pump apparatus like FIGS. 1-2, but with the valve shifted and thus connecting the circuits in a serial arrangement (i.e., combined in-series), the valve being in a state where both pumps (or if desired, only one of the pumps) move fluid through a combined battery cooling and powertrain cooling circuit.
Figure 4:
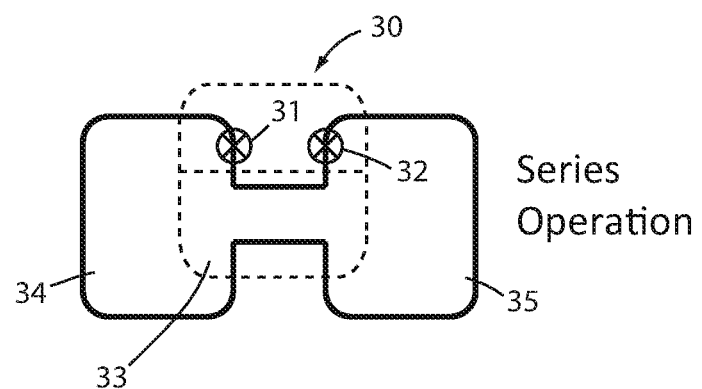

The illustrated pump apparatus 30 (FIG. 1) includes first and second pumps 31, 32 and a valve 33 operably connected to first and second cooling circuits 34, 35, with the valve 33 having a spool 36 controlled by an initial pressure difference in a first inlet and a second inlet as the pumps are strategically started in a desired sequence. This greatly simplifies controls and reduces components of the pumping system. Specifically, the movement of the spool 36 is controlled by initial pressure supplied from the first and/or second pumps 31, 32. The illustrated valve 33 is configured and interconnected so that when the second pump 32 fluid circuit pressure in a second valve inlet is greater than the first valve inlet from the first pump 31 (FIG. 1 such as when the pump 31 is turned on first), the spool 36 of the valve 33 shifts (to the left in FIG. 1), causing the first and second pumps 31, 32 to be connected in a parallel arrangement (FIG. 2) so that the first pump 31 moves fluid only through the first circuit 34, and the second pump 32 moves fluid only through the second circuit 35. But when the first pump 31 fluid circuit pressure in a first valve inlet is greater than the second valve inlet from the second pump 32 (FIGS. 3-4, such as when the pump 32 is turned on first while pump 31 is still off), the spool 36 of the valve 33 shifts (to the right in FIG. 3), causing the first and second pumps 31, 32 to be connected in a serial arrangement (FIG. 4) with fluid being pumped in series through first circuit 34 and then through the second circuit 35.

By this arrangement, many valve components and control components are eliminated, since control of the valve is accomplished simply by which pump is activated first or which pump creates a sufficient pressure differential as compared to the other pump. Also by this arrangement, one pump can act as a temporary backup to the other pump, such as if one of the pumps fail (i.e. by connecting the circuits in series). By this arrangement, one pump can act as a continuous pump for both circuits, yet additional cooling can be provided by activating both pumps. Notably, the two pumps could provide different pumped volumes, such that a first rate of cooling is provided in each cooling circuit when the pumps are operated in parallel, but a different rate of cooling is provided in the combined circuit when the pumps are operated in series. Alternatively, the pumps can act as backups to each other, where one is used as a temporary measure to continue to pump cooling fluid until the malfunctioning pump is fixed.

Figure 13:
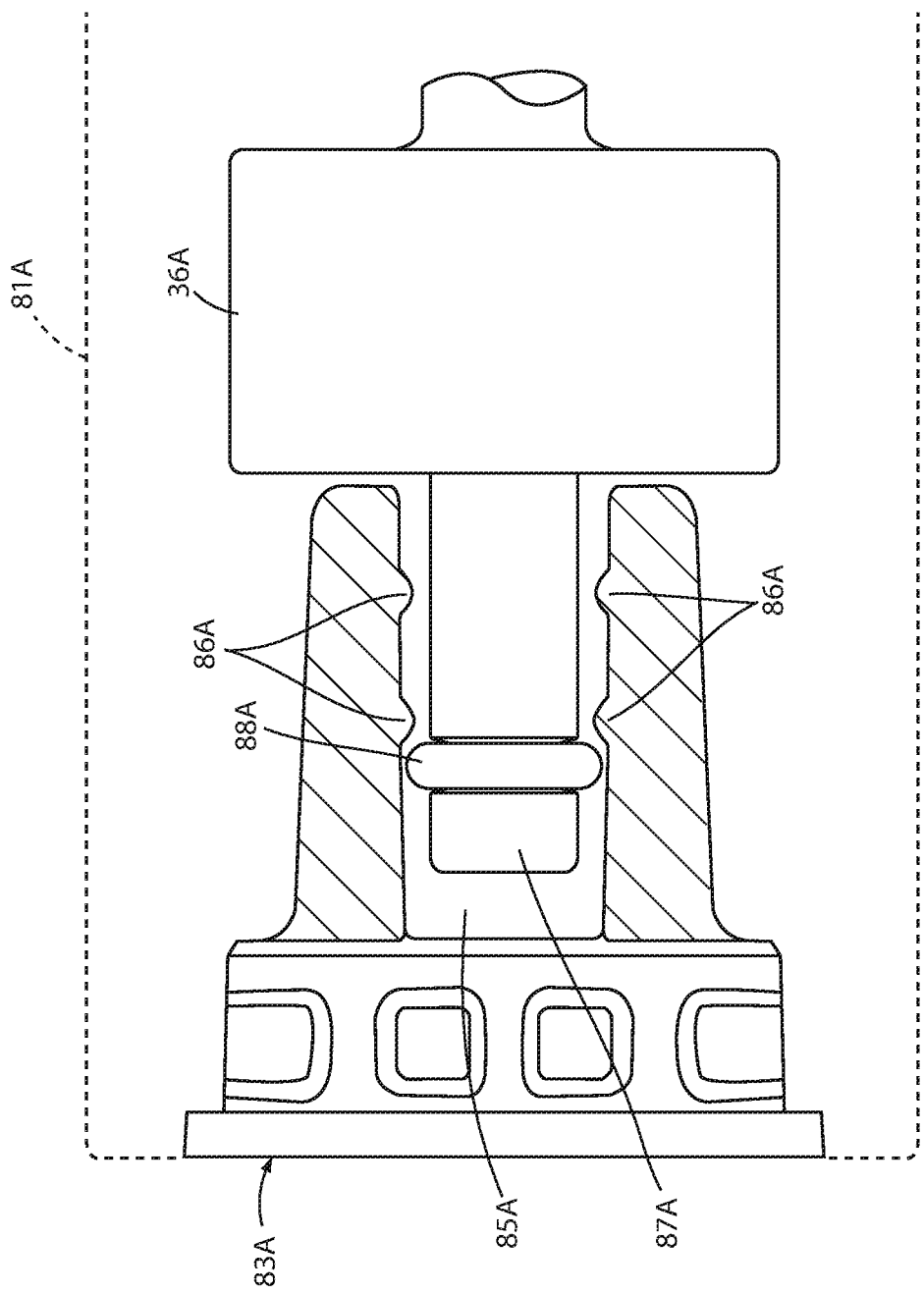
FIG. 13 is a fragmentary cross-sectional plan view of an end of the spool and a collinear plug for the valve body, showing an O-ring on an end of the spool and detents on the plug that prevent spool dithering and provide a resistance to spool position change until a defined threshold pressure differential between the first inlet and second inlet exists.

More specifically, in the present embodiment, a valve 33 is attached to the two pumps 31, 32 along with interconnected fluid passageways defined in part inside the valve body 80 (also called "valve housing"). Creating a pressure differential with the second pump 32 greater than the first pump 31 (FIG. 1) (such as by starting the second pump 32 before the first pump 31) causes the spool 36 of valve 33 to shift so that the $1^{st}$ and $2^{nd}$ pumps are connected to separate individual fluid lines (see FIG. 2) called "parallel cooling circuits" (e.g., transmission cooling circuit and battery cooling circuit). Specifically, when the pump 32 is turned on (with the first pump still off), pressurized fluid passes from the second pump into second inlet 51 along control passageway 52 to the end of the spool 36 of the valve 33, causing the spool 36 to shift to the left. When shifted to the left, pressurized fluid passes from second inlet 51 to flow-thru passageways 53, 54 to a second outlet 55. Fluid does not flow through passageway 62. When the first pump 31 is subsequently turned on (and the spool 36 does not shift due to continued pressure on its other end), fluid passes from the valve's first inlet 56 to pass-thru passageway 57, 58 to first outlet 59. Notably, pressurized fluid passing along control line 60 does not shift the spool 36 of the valve 33 due to the counterbalancing fluid pressure of control passageway 52 against an opposite end of the spool 36 and any additional detent force designed into the spool bore (FIG. 13).

Alternatively, creating a differential pressure with the first pump 31 (FIG. 3) greater than the second pump 32 (i.e., starting the first pump 31 first) causes the spool 36 of the valve 33 to shift (to the right in FIG. 3) so that the $1^{st}$ and $2^{nd}$ pumps are connected in series in a same circuit (FIG. 4) called "in-series cooling circuits." (Fluid is pumped from a collection sump/tank through the first pump to the transmission and back to the second pump and then to the batteries and then back to the collection sump [or pumped back to the first pump, depending on system requirements].) Specifically, when the first pump 31 is turned on first or commanded to pump faster, creating a pressure differential, pressurized fluid passes from the first inlet 56 along control passageway 60 to the left end of the spool 36 of the valve 33, causing the spool 36 to shift to the right. When shifted to the right, pressurized fluid passes from first inlet 56 to flow-thru passageways 61, 62 to the second outlet 55. When second pump 32 is subsequently turned on (and the spool 36 does not shift), fluid passes from second inlet 51 to pass-thru passageways 57, 58 to first outlet 59. Thus, a serial circuit is established with both pumps 31 and 32 in the circuit and pumping (if both pumps are turned on). Notably, pressurized fluid passing along control line 52 does not shift the spool 36 of the valve 33 due to the counterbalancing fluid pressure of control passageway 60 against an opposite end of the spool 36 and any additional detent force designed into the spool bore (FIG. 13). Also, pressurized fluid passes from the second pump 32 passes into second inlet 51 to flow-thru passageways 57, 58 to first outlet 59. Notably, one of the pumps 31 or 32 can be shut off if desired to conserve pump life and if one pump can handle the system volume of fluid delivery required.

A significant feature is that this arrangement eliminates many electronic controls and sensors and other relatively expensive components in known similar systems (both in terms of simplified manufacturing and simplified assembly), thus resulting in a much lower cost total system and a lower weight total system. The present apparatus is potentially particularly useful for hybrid and electrically-driven vehicles, where battery (or inverter) cooling is required, and where a transmission or combustion engine also requires cooling. It is noted that the present valve body is designed and located so that any leakage flows back to the sump, since the same fluid is used to cool both vehicle accessories (e.g., transmission and battery). This leakage also prevents lockup of the spool caused by trapped fluid at ends of the spool. Also, the present valve system is compact and designed for minimal space requirement, thus facilitating its placement within smaller low-weight vehicles.

Figure 5:
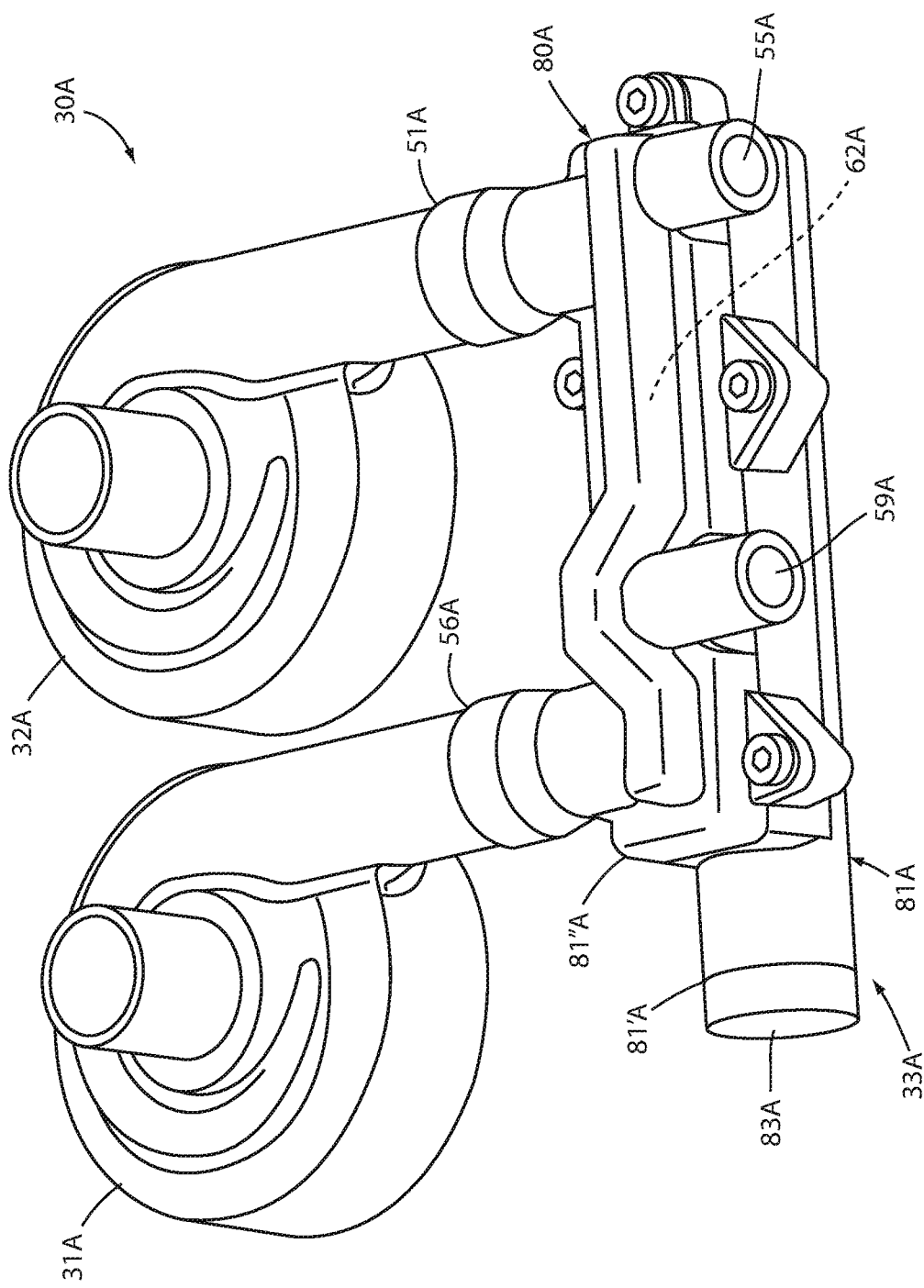

An exemplary prototype dual pump apparatus is shown in FIGS. 5-6 that incorporates characteristics and features of the apparatus 30 in FIG. 1-4. Identical and similar features and characteristics are identified using the same numbers, but including the letter "A." This is done to reduce redundant discussion.

The apparatus 30A (FIG. 5) includes two pumps 31A and 32A and a circuit-switching valve 33A with spool 36A operably connected to circuits 34A and 35A. The valve housing 80A (FIG. 6) includes a spool chamber 81A operably supporting the valve 33 and a porting cover 82A attached to the spool chamber 81A using a fluid-sealing gasket 65A at the interface. The valve housing 80A includes a first inlet 56A (connected to the output of first pump 31A), a first outlet 59A, a second inlet 51A (connected to the output of second pump 32A), and a second outlet 55A. FIG. 7 is a plan view of the valve in FIGS. 5-6, taken toward the gasket 65A and the valve 33A; and FIG. 8 is a plan view like FIG. 7, but with the gasket removed to thus better show underlying ports and inlets/outlets.

FIG. 9 is a perspective view of the apparatus of FIG. 5 with the valve housing shown as transparent, the valve housing defining inputs 1 and 2, and outputs A and B, the valve spool being in a first position (shifted to the left) and showing a flow path (highlighted) from input 1 to output A.

FIG. 10 is a perspective view of the apparatus like FIG. 9 with the valve housing shown as transparent, the valve spool being in a shifted second position (shifted to the right) and showing a flow path (highlighted) from input 1 to output B.

Figure 11A:
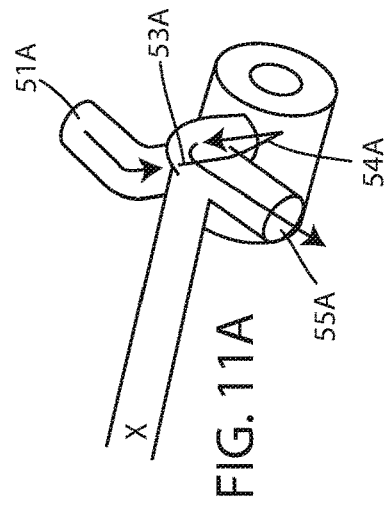
FIG. 11A is a view of the fluid flow from the input 2 to output B with the structure eliminated to better show a path of fluid movement.
Figure 11:
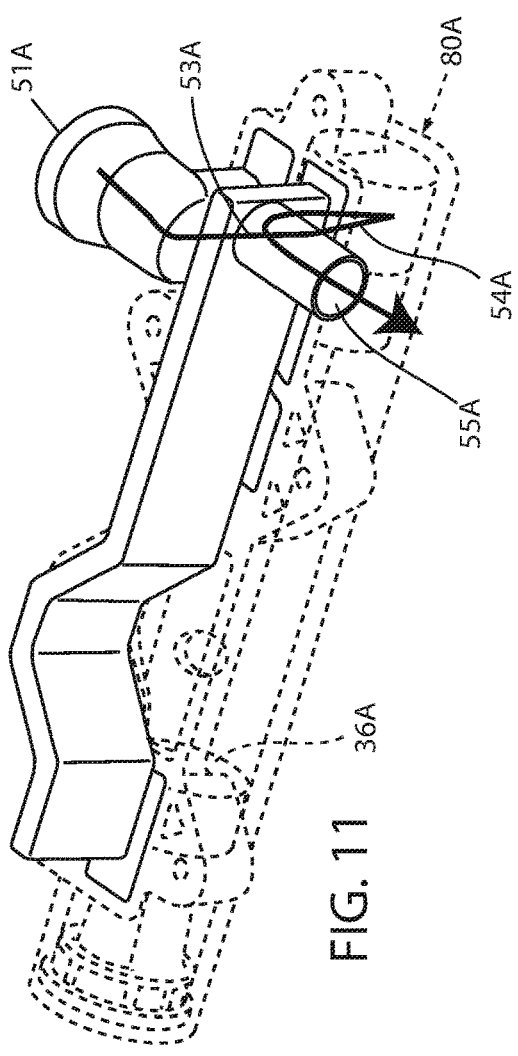
FIG. 11 is a perspective view of the apparatus like FIG. 9 with the valve housing shown as transparent, the valve spool being in a first position and showing a flow path (highlighted) from input 2 to output B.

FIG. 11 is a perspective view of the apparatus like FIG. 9 with the valve housing shown as transparent, the valve spool being in a first position (shifted to the left) and showing a flow path (highlighted) from input 2 to output B.

Figure 12:
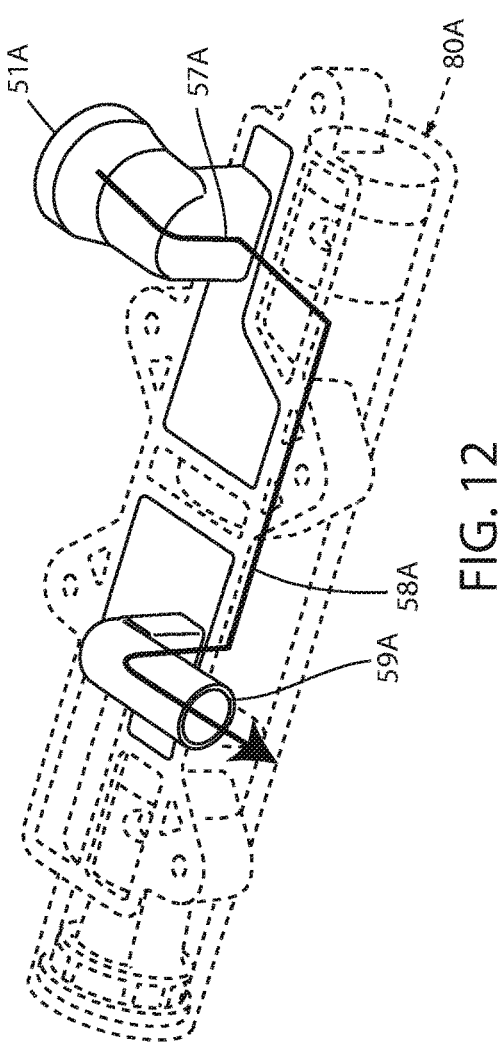
FIG. 12 is a perspective view of the apparatus like FIG. 9 with the valve housing shown as transparent, the valve spool being in a shifted second position and showing a flow path (highlighted) from input 2 to output A.
Figure 12A:
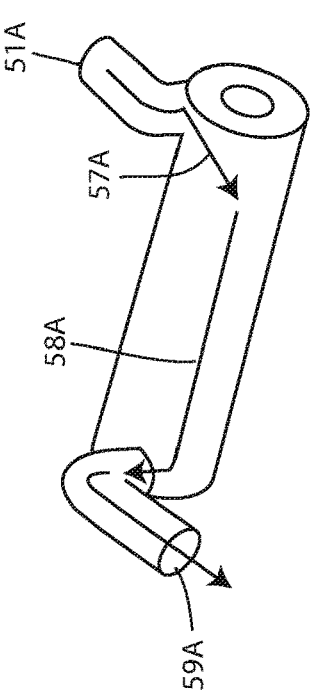
FIG. 12A is a view of the fluid flow from the input 2 to output A with the structure eliminated to better show a path of fluid movement.

FIG. 12 is a perspective view of the apparatus like FIG. 9 with the valve housing shown as transparent, the valve spool being in a shifted second position (shifted to the right) and showing a flow path (highlighted) from input 2 to output A.

FIG. 13 is a fragmentary cross-sectional plan view of an end of the spool 36A and a collinear plug 83A for the valve body 81A (also called "spool chamber"). The plug 83A and valve body 81A form an anti-dithering device. The illustrated anti-dithering device includes a bore 85A in the plug 83A, ring ridges 86A in the bore 85A, and an O-ring 88A on a protrusion 87A extending from an end of the spool 36A, with the interaction of the O-ring 88A and the ridges 86A preventing spool dithering.

Figure 14:
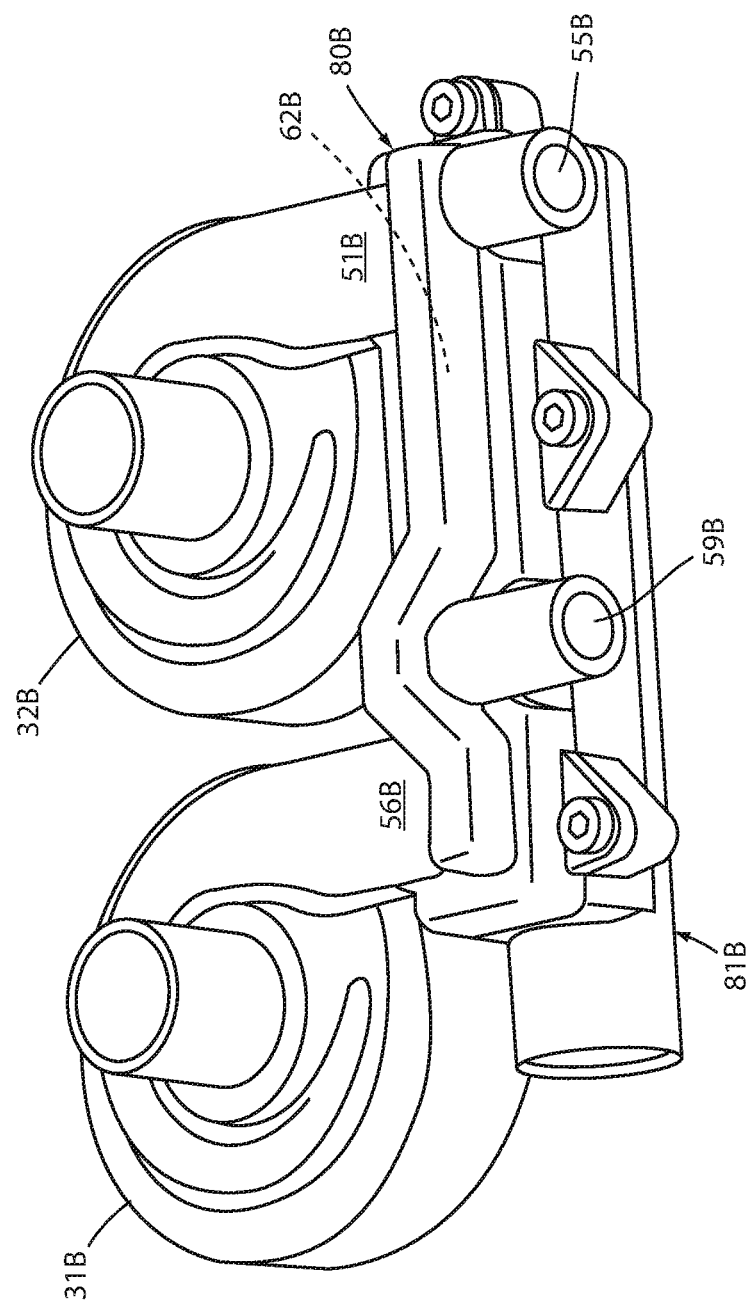
FIG. 14 is a perspective view of a modified pump apparatus with a valve similar to FIG. 5, but having a more compact design with pump structure integrated into the valve housing, including integrated structure forming inlets and outlets, volutes for pump impellors, attachment tabs and related features.

FIG. 14 is a perspective view of a modified pump apparatus with a valve similar to that in FIG. 5, but having a more compact design with the pump structure integrated into the valve housing.

The present innovation provides advantages to many dual pump configurations. In particular, the present innovation could potentially be used with and provide advantages to the multi-pump system shown in co-owned U.S. Pat. No. 9,587,639, the disclosure of which is incorporated herein for the reader's benefit. The advantages include things like integration of electronics and reduction of required electrical components for control, advantages in the cooling of circuitry, and improved electrical connection with a common connector for a single wiring harness.

The embodiments shown in FIGS. 1-12 show the spool chamber as a very distinct and separate unit. It is contemplated that the valve housing (80) including the spool chamber and porting cover can include features of the pump housing of pumps 31, 32, as illustrated in FIG. 14, thus allowing the assembly to position the spool chamber much closer to the motors/pumps in a compact assembly. It is also noted that a size of the spool diameter and bore can be reduced to match functional requirements of a particular vehicle system without compromising function.

Figure 15:
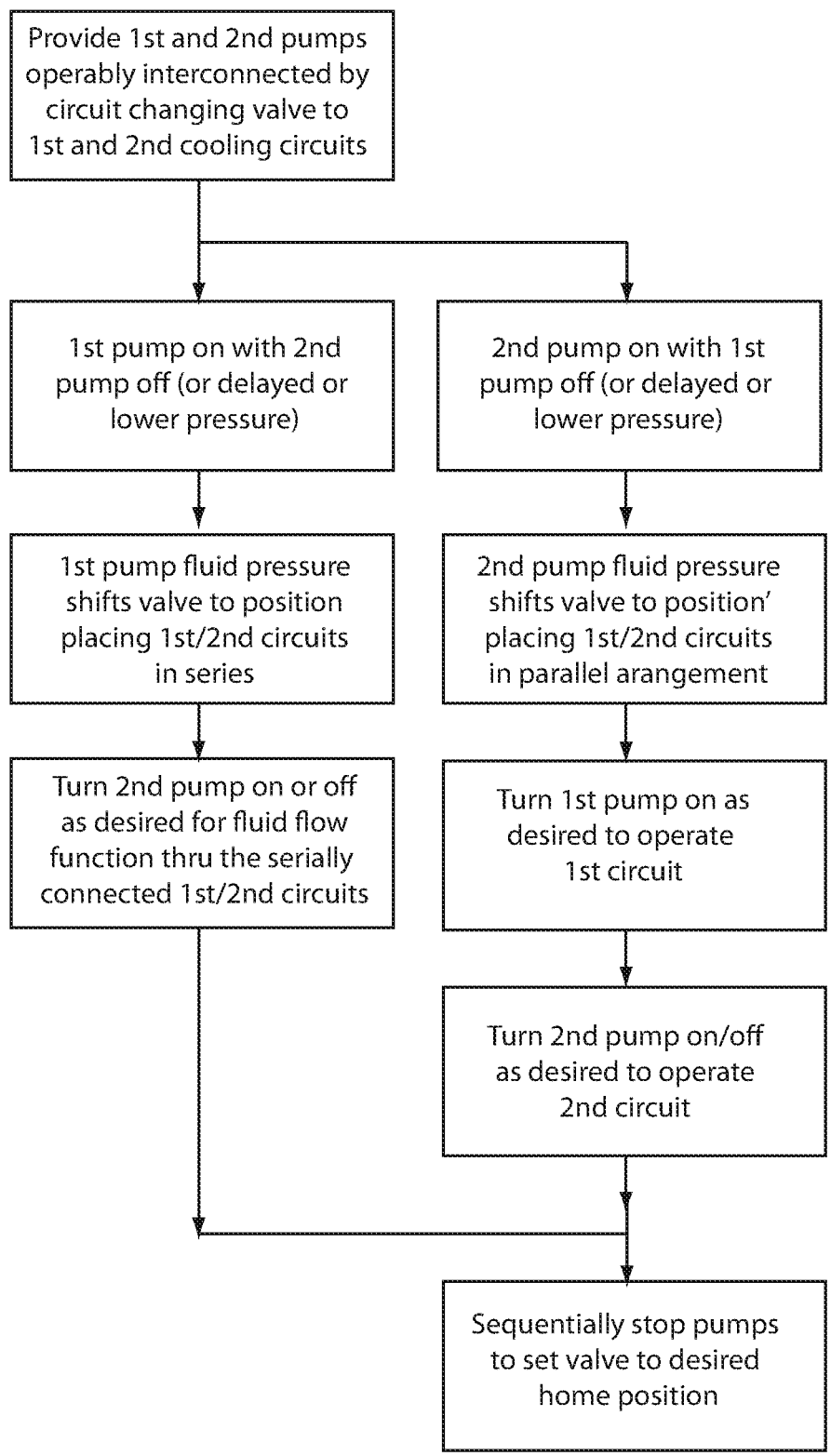
FIG. 15 is a flow chart showing a method for the above-described two pump and valve arrangements.

FIG. 15 is a flow chart showing a method of use relating to the above-described two pump and valve arrangements.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A pump apparatus having a first fluid cooling circuit and a separate second fluid cooling circuit comprising:
    a first pump;
    a second pump;
    a circuit-changing valve defining a first inlet connected to the first pump and a second inlet connected to the second pump, and having a first outlet connected to the first fluid cooling circuit and a second outlet connected to the second fluid cooling circuit;
    the valve having a spool shiftable relative to the first inlet and the second inlet and the first outlet and second outlet;
    the valve and spool being configured so that a difference in pressure created by the first pump causes the spool to shift to a first position and causes the first pump and the second pump to be connected in a serial arrangement where the first inlet is connected to the second outlet and the second inlet is connected to the first outlet, thus causing fluid from the first pump and the second pump to flow in series through both the first fluid cooling circuit and the second fluid cooling circuit; and
    the valve and spool being configured so that a difference in pressure created by the second pump causes the spool to shift to a second position and causes the first pump and the second pump to be connected in a parallel arrangement where the first inlet is connected to the first outlet and the second inlet is connected to the second outlet, thus causing fluid from the first pump to flow only through the first fluid cooling circuit and fluid from the second pump to flow only through the second fluid cooling circuit.

2. The pump apparatus defined in claim 1, wherein the spool incorporates a spool shifting mechanism responsive to fluid pressures in the first fluid cooling circuit and the second fluid cooling circuit at the time of starting the first pump, and at the time of starting the second pump, and at any time a pressure difference exists between the first inlet and the second inlet.

3. The pump apparatus defined in claim 2, wherein the spool and the spool shifting mechanism are not operably connected to a separate control, but instead are operated solely by fluid pressures in the first inlet and the second inlet to thus cause the spool to shift to selectively control the first pump and the second pump.

4. The pump apparatus defined in claim 3, wherein the spool interacts with a spool housing to create a mechanical resistance to movement of the spool until a predetermined force, created by differential fluid pressure between the first inlet and the second inlet acting on the spool, is reached.

5. The pump apparatus defined in claim 4, including the first fluid cooling circuit and the second fluid cooling circuit; the first fluid cooling circuit being for cooling at least one of a vehicle power train, an engine, a transmission, an associated auxiliary system, and any combination thereof; and the second fluid cooling circuit being for cooling at least one of a battery, an electrical power source, an inverter, a turbocharging heating system, a vehicle heating system; and any combination thereof.

6. A method of controlling a first fluid cooling circuit and a second fluid cooling circuit, the method comprising:
    providing a first pump and a second pump;
    providing a circuit-changing valve defining a first inlet connected to the first pump and a second inlet connected to the second pump, and having a first outlet connected to the first fluid cooling circuit and a second outlet connected to the second fluid cooling circuit; the valve having a spool shiftable relative to the first inlet and the second inlet and the first outlet and the second outlet;
    when the first pump generates a pressure in the first inlet greater than a pressure generated by the second pump in the second inlet, thereby shifting the spool to cause the first pump and the second pump to be connected in a serial arrangement where the first inlet is connected to the second outlet and the second inlet is connected to the first outlet, thus causing fluid from the first pump and the second pump to flow in series through both the first fluid cooling circuit and the second fluid cooling circuit; and
    when the second pump generates pressure in the second inlet greater than the pressure generated by the first pump in the first inlet, thereby shifting the spool to cause the first pump and the second pump to be connected in a parallel arrangement where the first inlet is connected to the first outlet and the second inlet is connected to the second outlet, thus causing fluid from the first pump to flow only through the first fluid cooling circuit and fluid from the second pump to flow only through the second fluid cooling circuit.

7. The method of claim 6, wherein the spool incorporates a spool shifting mechanism responsive to fluid pressures in the first fluid cooling circuit and the second fluid cooling circuit at the time of starting the first pump, and at the time of starting the second pump, and at any time a pressure difference exists between the first inlet and the second inlet, and wherein the spool and the spool shifting mechanism are not operably connected to a separate control, but instead are operated solely by fluid pressures in the first inlet and the second inlet to thus cause the spool to shift to selectively control the first pump and the second pump.

8. A method of controlling first and second fluid cooling circuits, comprising:
    providing a first positive displacement pump and a second positive displacement pump providing a circuit-changing valve defining a first inlet connected to the first pump and a second inlet connected to the second pump, and having a first outlet connected to the first cooling circuit and a second outlet connected to the second cooling circuit; the valve having a spool shiftable relative to the first inlet and the second inlet and the first outlet and the second outlet;

when a flow direction of the first pump is reversed, generating a negative pressure in the first inlet less than the pressure in the second inlet that shifts the spool to a first position; and when a flow direction of the second pump is reversed, generating a negative pressure in the second inlet less than the pressure in the first inlet that shifts the spool to a second position.

9. A vehicle apparatus, comprising:
- a wheeled vehicle including a power plant and an energy source connected to the power plant, with both the power plant and the energy source generating heat;
- a first fluid cooling circuit connected to the power plant and a separate second fluid cooling circuit connected to the energy source;
- a first pump;
- a second pump;
- a valve housing defining a first inlet connected to the first pump and a second inlet connected to the second pump, and a first outlet connected to the first cooling circuit and a second outlet connected to the second cooling circuit;
- a single spool shiftable relative to the first inlet and the second inlet and the first outlet and the second outlet;
- a spool-shifting device operably connected to one or more of the first inlet, the second inlet, the first outlet, and the second outlet;
- the valve housing, the single spool, and the spool-shifting device being configured and operably interconnected so that a difference in fluid pressure created by the first pump causes the single spool to shift to a first position and causes the first pump and the second pump to be connected in a serial arrangement where the first inlet is connected to the second outlet and the second inlet is connected to the first outlet, thus causing fluid from the first pump and the second pump to flow in series through both the first circuit and the second circuit; and
- the valve housing and the single spool being configured so that a difference in fluid pressure created by the second pump causes the single spool to shift to a second position and causes the first pump and the second pump to be connected in a parallel arrangement where the first inlet is connected to the first outlet and the second inlet is connected to the second outlet, thus causing fluid from the first pump to flow only through the first fluid cooling circuit and fluid from the second pump to flow only through the second fluid cooling circuit.

10. The apparatus of claim 9, including an anti-dithering device attached to the valve housing to prevent dithering of the single spool.

* * * * *